United States Patent
Freitag et al.

(10) Patent No.: US 8,648,163 B2
(45) Date of Patent: *Feb. 11, 2014

(54) HIGH MOLECULAR WEIGHT, RANDOM, BISPHENOL BASED COPOLY(PHOSPHONATE CARBONATE)S

(71) Applicants: FRX Polymers, Inc., Chelmsford, MA (US); Bayer Material Science AG, Leverkusen (DE)

(72) Inventors: Dieter Freitag, Krefeld (DE); Pin Go, Lowell, MA (US); Lawino Kagumba, Cambridge, MA (US); Stephan Konrad, Dormagen (DE); Helmut-Werner Heuer, Krefeld (DE); Berit Krauter, Neuss (DE); Pieter Ooms, Krefeld (DE); Michael Prein, Krefeld (DE); Johann Rechner, Kempen (DE)

(73) Assignees: FRX Polymers, Inc., Chelmsford, MA (US); Bayer Material Science AG, Leverkusen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/764,513

(22) Filed: Feb. 11, 2013

(65) Prior Publication Data

US 2013/0158147 A1 Jun. 20, 2013

Related U.S. Application Data

(63) Continuation of application No. 13/235,046, filed on Sep. 16, 2011, now Pat. No. 8,389,664.

(60) Provisional application No. 61/383,697, filed on Sep. 16, 2010, provisional application No. 61/383,686, filed on Sep. 16, 2010.

(51) Int. Cl.
*C08G 64/00* (2006.01)
*C08G 63/02* (2006.01)

(52) U.S. Cl.
USPC ........ 528/196; 252/299.3; 524/161; 524/162; 525/415; 525/462; 528/198

(58) Field of Classification Search
USPC ........ 252/299.3; 524/161, 162; 525/415, 462; 528/196, 198
See application file for complete search history.

(56) References Cited

U.S. PATENT DOCUMENTS

| | | | |
|---|---|---|---|
| 2,682,522 A | 6/1954 | Coover, Jr. et al. | |
| 2,891,915 A | 6/1959 | McCormack et al. | |
| 4,223,104 A | 9/1980 | Kim et al. | |
| 4,322,520 A | 3/1982 | Schmidt et al. | |
| 4,328,174 A | 5/1982 | Schmidt et al. | |
| 4,331,614 A | 5/1982 | Schmidt et al. | |
| 4,481,350 A | 11/1984 | Schmidt et al. | |
| 4,508,890 A | 4/1985 | Schmidt et al. | |
| 4,762,905 A | 8/1988 | Schmidt et al. | |
| 4,782,123 A | 11/1988 | Kauth et al. | |
| 7,645,850 B2 | 1/2010 | Freitag | |
| 8,389,664 B2 * | 3/2013 | Freitag et al. | 528/196 |
| 2009/0043013 A1 | 2/2009 | Stahl et al. | |

FOREIGN PATENT DOCUMENTS

WO WO 2007065094 A2 6/2007

OTHER PUBLICATIONS

International Search Report dated Apr. 27, 2012 for PCT/US2011/052005.
H. Schnell, "Chemistry and Physics of Polycarbonates", *Polymer Reviews*, Bd. 9, pp. 50-51; Interscience Publishers: New York, 1964.
Henkel, "Reactor Types and Their Industrial Applications", *Ullmann's Encyclopedia of Industrial Chemistry*, vol. 31, pp. 293-327 (published online 2012), Wiley-VCH Verlag GmbH Co., KGaA, Weinheim (TOC).

* cited by examiner

*Primary Examiner* — Terressa Boykin
(74) *Attorney, Agent, or Firm* — Pepper Hamilton LLP

(57) ABSTRACT

Disclosed are random copoly(phosphonate carbonate)s with the high molecular weight and narrow molecular weight distribution exhibiting a superior combination of properties compared to prior art.

25 Claims, No Drawings

HIGH MOLECULAR WEIGHT, RANDOM, BISPHENOL BASED COPOLY(PHOSPHONATE CARBONATE)S

CROSS-REFERENCE TO RELATED APPLICATIONS

This application is a continuation of U.S. application Ser. No. 13/235,046, now U.S. Pat. No. 8,389,664, entitled "High Molecular Weight, Random, Bisphenol Based Copoly(phosphonate carbonate)s" filed Sep. 16, 2011, which claims priority to U.S. Provisional Application No. 61/383,697 entitled "Synthesis And Composition Of Linear, High Molecular Weight, Random, Bisphenol A-Based Copoly(Phosphonate Carbonate)s That Have A Specific Phosphonate Content And A Narrow Molecular Weight Distribution" filed Sep. 16, 2010, and U.S. Provisional Application No. 61/383,686 entitled "High Molecular Weight, Random, Bisphenol Based Copoly(Phosphonate Carbonate)s" filed Sep. 16, 2010, which are herein incorporated by reference in their entirety.

GOVERNMENT INTERESTS

Not applicable

PARTIES TO A JOINT RESEARCH AGREEMENT

Not applicable

INCORPORATION BY REFERENCE OF MATERIAL SUBMITTED ON A COMPACT DISC

Not applicable

BACKGROUND

Not applicable

SUMMARY OF THE INVENTION

Various embodiments of the invention are directed to flame retardant random copoly(phosphonate carbonate)s derived from at least 20 mole percent diphenylmethyl phosphonate (DPP), based on the total amount of transesterification components DPP and diphenyl carbonate (DPC), and bisphenol A (BPA) and a specific volatile transesterification catalyst with both a high molecular weight and a narrow molecular weight distribution. Various other embodiments are directed to a process and method for making them using high purity DPP, and at least one specific volatile, metal-free catalyst, e.g., tetraphenyl phosphonium phenolate (TPPP).

Other embodiments provide flame retardant engineering random copoly(phosphonate carbonate)s and polymer compositions including these random copoly(phosphonate carbonate)s and another oligomer or polymer. These copoly(phosphonate carbonate)s and polymer compositions generally may exhibit excellent combination of properties including good melt processability, good mechanical properties, good hydrolytic stability, and good heat stability as measured by heat distortion temperature (HDT).

Still other embodiments are directed to articles of manufacture prepared from the random copoly(phosphonate carbonate)s of the invention, as well as polymer compositions including the random copoly(phosphonate carbonate)s of the invention and another oligomer or polymer. The flame retardant engineering random copoly(phosphonate carbonate)s and polymer compositions of the invention can be used as coatings, or they can be used to fabricate adhesive formulations, fiber reinforced prepregs, free-standing films, fibers, foams, molded articles, and fiber reinforced composites. They can be used alone or in any combination with other monomers, polymers, copolymers, oligomers, catalysts, and fillers. The flame retardant engineering random copoly(phosphonate carbonate)s and polymer compositions can in turn be used as components, sub-components, or parts of more complex devices such as consumer electronics (e.g., televisions, computers, printers, photocopiers, fax machines, video players, electronic gaming systems, modems, cellular phones and a variety of other electronic devices and components).

DESCRIPTION OF DRAWINGS

Not applicable

DETAILED DESCRIPTION

The above summary of the present invention is not intended to describe each illustrated embodiment or every possible implementation of the present invention. The detailed description, which follows, particularly exemplifies these embodiments.

Before the present compositions and methods are described, it is to be understood that they are not limited to the particular compositions, methodologies or protocols described, as these may vary. It is also to be understood that the terminology used in the description is for the purpose of describing the particular versions or embodiments only, and is not intended to limit their scope which will be limited only by the appended claims.

It must also be noted that as used herein and in the appended claims, the singular forms "a", "an", and "the" include plural reference unless the context clearly dictates otherwise. Unless defined otherwise, all technical and scientific terms used herein have the same meanings as commonly understood by one of ordinary skill in the art. Although any methods and materials similar or equivalent to those described herein can be used in the practice or testing of embodiments disclosed, the preferred methods, devices, and materials are now described.

"Optional" or "optionally" means that the subsequently described event or circumstance may or may not occur, and that the description includes instances where the event occurs and instances where it does not.

"Substantially no" means that the subsequently described event may occur at most about less than 10% of the time or the subsequently described component may be at most about less than 10% of the total composition, in some embodiments, and in others, at most about less than 5%, and in still others at most about less than 1%.

The term "carbonate" as used herein is given its customary meaning, e.g., a salt of carbonic acid containing the divalent, negative radical CO or an uncharged ester of this acid. A "diaryl carbonate" is a carbonate with at least two aryl groups associated with the CO radical, the most predominant example of a diaryl carbonate is diphenyl carbonate; however, the definition of diaryl carbonate is not limited to this specific example.

The term "aromatic dihydroxide" is meant to encompass any aromatic compound with at least two associated hydroxyl substitutions. Examples of "aromatic hydroxides" include but are not limited to benzene diols such as hydroquinone and any bisphenol or bisphenol containing compounds.

The term "alkyl" or "alkyl group" refers to a branched or unbranched hydrocarbon or group of 1 to 20 carbon atoms, such as but not limited to methyl, ethyl, n-propyl, isopropyl, n-butyl, isobutyl, t-butyl, octyl, decyl, tetradecyl, hexadecyl, eicosyl, tetracosyl and the like. "Cycloalkyl" or "cycloalkyl groups" are branched or unbranched hydrocarbons in which all or some of the carbons are arranged in a ring such as but not limited to cyclopentyl, cyclohexyl, methylcyclohexyl and the like. The term "lower alkyl" includes an alkyl group of 1 to 10 carbon atoms.

The term "aryl" or "aryl group" refers to monovalent aromatic hydrocarbon radicals or groups consisting of one or more fused rings in which at least one ring is aromatic in nature. Aryls may include but are not limited to phenyl, napthyl, biphenyl ring systems and the like. The aryl group may be unsubstituted or substituted with a variety of substituents including but not limited to alkyl, alkenyl, halide, benzylic, alkyl or aromatic ether, nitro, cyano and the like and combinations thereof.

"Substituent" refers to a molecular group that replaces a hydrogen in a compound and may include but are not limited to trifluoromethyl, nitro, cyano, $C_1$-$C_{20}$ alkyl, aromatic or aryl, halide (F, Cl, Br, I), $C_1$-$C_{20}$ alkyl ether, benzyl halide, benzyl ether, aromatic or aryl ether, hydroxy, alkoxy, amino, alkylamino (—NHR'), dialkylamino (—NR'R") or other groups which do not interfere with the formation of the diaryl alkylphosphonate.

As defined herein, an "arylol" or an "arylol group" is an aryl group with a hydroxyl, OH, group substituent on the aryl ring. Non-limiting examples of an arylol are phenol, naphthalene and the like. A wide variety of arlyols may be used in the embodiments of the invention and are commercially available.

The term "alkanol" or "alkanol group" refers to a compound including an alkyl of 1 to 20 carbon atoms or more having at least one hydroxyl group substituent. Examples of alkanols include but are not limited to methanol, ethanol, 1- and 2-propanol, 1,1-dimethylethanol, hexanol, octanol and the like. Alkanol groups may be optionally substituted with substituents as described above.

The term "alkenol" or "alkenol group" refers to a compound including an alkene 2 to 20 carbon atoms or more having at least one hydroxyl group substituent. The hydroxyl may be arranged in either isomeric configuration (cis or trans). Alkenols may be further substituted with one or more substituents as described above and may be used in place of alkanols in some embodiments of the invention. Alkenols are known to those skilled in the art and many are readily available commercially.

The terms "flame retardant," "flame resistant," "fire resistant," or "fire resistance" as used herein, mean that the composition exhibits a limiting oxygen index (LOI) of at least 27. In addition, these terms may relate to the flame reference standard for electronic compositions UL-94 of V0, V1, or V2.

The term "hydrolytic stability" as used herein is defined as the ability of the polymer to resist hydrolysis in a water boil test. The ability to resist hydrolysis can be measured by the change in relative viscosity after exposure which is an indication in molecular weight change. For example, a neat resin sample can be placed in pure water (triple distilled) for up to 168 hours under reflux conditions at normal pressure. The samples can be removed periodically, and the relative viscosity ($\eta_{rel}$) can be determined by dissolving the sample in dichloromethane at 25° C. at a concentration of 0.5 g polymer/liter and measuring the solution with an Ubbelohde viscometer. A significant change in the $\eta_{rel}$ value after the water boil is indicative of a change in molecular weight of the polymer due to hydrolysis. A polymer with good hydrolytic stability would not exhibit a significant change in $\eta_{rel}$ as a result of this test.

"Molecular weight," as used herein, can be determined by relative viscosity ($\eta_{rel}$) and/or gel permeation chromatography (GPC). "Relative viscosity" of a polymer is measured by dissolving a known quantity of polymer in a solvent and comparing the time it takes for this solution and the neat solvent to travel through a specially designed capillary (viscometer) at a constant temperature. Relative viscosity is a measurement that is indicative of the molecular weight of a polymer. It is also well known that a reduction in relative viscosity is indicative of a reduction in molecular weight, and reduction in molecular weight causes loss of mechanical properties such as strength and toughness. GPC provides information about the molecular weight and molecular weight distribution of a polymer. It is known that the molecular weight distribution of a polymer is important to properties such as thermo-oxidative stability (due to different amount of end groups), toughness, melt flow, and fire resistance, for example, low molecular weight polymers drip more when burned.

The term "toughness", as used herein, is determined qualitatively on a film or a molded specimen.

Polycarbonates (PC) are outstanding engineering thermoplastics that have an excellent combination of properties, such as, high heat distortion temperature (HDT), low color, transparency, melt processability, and outstanding toughness. These materials are used in a wide variety of applications and are produced commercially on an enormous scale. However, polycarbonates lack the requisite flame resistance, and there is a demand and still a need for flame resistant PCs that also maintain their other advantageous properties. A variety of approaches have been undertaken to impart flame resistance to these materials, but these approaches have been unsuccessful largely because they detract from the important inherent properties that PCs possess.

In all of the prior art relating to random copoly(phosphonate carbonate)s from the melt polycondensation reaction of DPC, DPP and BPA, generation of a random high molecular weight copolymer based on BPA only with a narrow molecular weight distribution has not been achieved. Another recurrent problem arising from the use of DPP in combination with polycarbonates is the reduced hydrolytic stability of the synthesized product. Therefore, a new process and method for the preparation of copoly(phosphonate carbonate)s containing significant amounts of DPP displaying enhanced hydrolytic stability over the material known from the state of the art.

Embodiments of the invention generally relate to random copoly(phosphonate carbonate) and processes and methods for making them via melt polycondensation. In some embodiments, these random copoly(phosphonate carbonate)s may include at least 20 mole percent high purity diaryl alkylphosphonate or optionally substituted diaryl alkylphosphonate, one or more diaryl carbonate, and one or more aromatic dihydroxide, wherein the mole percent of the high purity diaryl alkylphosphonate is based on the total amount of transesterification components, i.e., total diaryl alkylphosphonate and total diaryl carbonate. As indicated by the term "random" the monomers of the copoly(phosphonate carbonate)s of various embodiments are incorporated into polymer chain randomly. Therefore, the polymer chain may include alternating phosphonate and carbonate monomers linked by an aromatic dihydroxide and/or various segments in which several phosphonate or several carbonate monomers form oligophosphonate or polyphosphonate or oligocarbonate or polycarbonate segments. Additionally, the length of various oligo or polyphosphonate oligo or polycarbonate segments may vary within individual copoly(phosphonate carbonate)s.

The phosphonate and carbonate content of the copoly (phosphonate carbonate)s may vary among embodiments, and embodiments are not limited by the phosphonate and/or carbonate content or range of phosphonate and/or carbonate content. For example, in some embodiments, the copoly (phosphonate carbonate)s may have a phosphorus content, which is indicative of the phosphonate content of from about 1% to about 20% by weight of the total copoly(phosphonate carbonate), and in other embodiments, the phosphorous content of the copoly(phosphonate carbonate)s of the invention may be from about 2% to about 10% by weight of the total polymer.

The copoly(phosphonate carbonate)s of various embodiments exhibit both a high molecular weight and a narrow molecular weight distribution (i.e., low polydispersity). For example, in some embodiments, the copoly(phosphonate carbonate)s may have a weight average molecular weight (Mw) of about 10,000 g/mole to about 100,000 g/mole as determined by $\eta_{rel}$ GPC, and in other embodiments, the copoly (phosphonate carbonate)s may have a Mw of from about 12,000 to about 80,000 g/mole as determined by $\eta_{rel}$ or GPC. The number average molecular weight (Mn) in such embodiments may be from about 5,000 g/mole to about 50,000 g/mole, or from about 8,000 g/mole to about 15,000 g/mole, and in certain embodiments the Mn may be greater than about 9,000 g/mole. The narrow molecular weight distribution (i.e., Mw/Mn) of such copoly(phosphonate carbonate)s may be from about 2 to about 7 in some embodiments and from about 2 to about 5 in other embodiments. In still other embodiments, the random copoly(phosphonate carbonate)s may have a relative viscosity of from about 1.10 to about 1.40.

Without wishing to be bound by theory, the use of high purity diaryl alkylphosphonate or optionally substituted diaryl alkylphosphonate, and in particular embodiments, high purity DPP, in the preparation of the copoly(phosphonate carbonate)s of the invention may provide improved properties over random copolymers of the prior. The "high purity" diaryl alkylphosphonate or optionally substituted diaryl alkylphosphonate and DPP of various embodiments may include total acidic components of less than about 0.15% by weight, less than about 0.10% by weight, and in certain embodiments, less than about 0.05% by weight. Such acidic components are known in the art and may include, but are not limited to, phosphoric acid, phosphonic acid, methyl phosphonic acid, and methyl phosphonic acid mono phenylester. Because the diaryl alkylphosphonate or optionally substituted diaryl alkylphosphonate or DPP contains used in the preparation of the random copolymers of the invention include low levels of such acidic components, the random copoly(phosphonate carbonate)s produced using these high purity phosphonate monomers may include significantly reduced levels of the acidic component contaminants. In some embodiments, the random copoly(phosphonate carbonate)s may include substantially no acidic component contaminants, and in other embodiments, the random copoly(phosphonate carbonate)s may include, for example, total acidic components of less than about 0.15% by weight, less than about 0.10% by weight, and in certain embodiments, less than about 0.05% by weight.

The random copoly(phosphonate carbonate)s of the invention generally exhibit high molecular weight and narrow molecular weight distribution, which in-turn, may impart a superior combination of properties. For example, the random copoly(phosphonate carbonate)s of embodiments are generally tough, extremely flame retardant, and exhibit superior hydrolytic stability. In addition, the copoly(phosphonate carbonate)s of embodiments generally exhibit an excellent combination of processing characteristics including, for example, good thermal and mechanical properties.

In some embodiments, the random copoly(phosphonate carbonate)s of the invention can be used alone as an engineering polymer, and in other embodiments, the random copoly (phosphonate carbonate)s may be used as additives that are combined with other polymers to provide flame resistance without detracting from other important properties. Certain embodiments include articles of manufacture and coatings prepared from the random copoly(phosphonate carbonate)s of the invention alone or in combination with another polymer. In still other embodiments, engineering polymers of the random copoly(phosphonate carbonate)s of the invention and polymer compositions including the random copoly(phosphonate carbonate)s of the invention may be combined with a reinforcement material such as, for example, glass, carbon, silicon carbide, organic fibers, and the like and combinations thereof to produce composites having an advantageous combination of fire resistance and dimensional stability while maintaining high HDT near that of the unmodified engineering polymer.

Other embodiments are directed to methods and processes for preparing random copoly(phosphonate carbonate)s. For example, in some embodiments, such methods may include the steps of combining one or more diaryl alkylphosphonate or optionally substituted diaryl alkylphosphonate, one or more diaryl carbonate, one or more aromatic dihydroxide, and a transesterification catalyst, and reacting the one or more diaryl alkylphosphonate or optionally substituted diaryl alkylphosphonate, one or more diaryl carbonate, one or more aromatic dihydroxide, and transesterification catalyst in a melt. In such embodiments, the diaryl alkylphosphonate may be high purity diaryl alkylphosphonate and may be provided at at least 20 mole percent based on the total amount of transesterification components diaryl alkylphosphonate and diaryl carbonate combined with the bisphenol BPA. In certain embodiments, the diaryl alkylphosphonate may be DPP. As discussed above, the high purity diaryl alkylphosphonate or optionally substituted diaryl alkylphosphonate of various embodiments may include total acidic components of less than about 0.15% by weight, less than about 0.10% by weight, and in certain embodiments, less than about 0.05% by weight.

The polycondensation of various embodiments is effectuated by melt transesterification process carried out under vacuum. Without wishing to be bound by theory, carrying out transesterification under vacuum may allow for the removal of volatile by-products. The melt transesterification can be conducted in a continuous or multi-step (dis-continuous) method, and in certain embodiments, the melt transesterification may be conducted in a continuous process. The preparation of the diaryl carbonate used in the melt transesterification process for aromatic polycarbonates and copoly (phosphonate carbonate)s, for example by the phase boundary process, is described in principle in the literature, cf. for example in Chemistry and Physics of Polycarbonates, Polymer Reviews, H. Schnell, Vol. 9, John Wiley and Sons, Inc. (1964), pages 50/51 which is hereby incorporated by reference in its entirety.

The melt transesterification may be carried out in a single step or in multiple steps. For example, in some embodiments, the method may include a precondensation step in which the dihydroxyaryl compound (bisphenol) is reacted with the diaryl carbonate and diaryl alkylphosphonate using at least one volatile catalyst with separating off of phenol formed during condensation, and in some embodiments, the method may include a post reaction step in which the molecular weight of the condensate is increased following precondensation using one or more reaction evaporator stages. The number of reaction stages is not limited, and in various embodiments, the number of reaction stages may be from 2 to 10, from 3 to 8, and in certain embodiments, from 5 to 7.

In some embodiments, the reaction temperature for each step of the method may be from about 150° C. to about 400° C., and in other embodiments, the reaction temperature for each step of the method may be from about 180° C. to about 330° C. In such embodiments, the residence time for each step may be from about 15 minutes to about 6 hours, and pressure for each step may be from about 250 mbar to about 0.01 mbar. In some embodiments, the reaction temperature may increase from one step to the other and the pressure may decrease from one step to the next. In embodiments including a two step process, the transesterification reaction of the aromatic dihydroxide, diaryl carbonate, diaryl alkylphosphonate and at least one catalyst in the melt is preferably carried out in two stages. In the first stage, the melting of the aromatic dihydroxide, diaryl carbonate, and diaryl alkylphosphonate may be carried out at a temperature of from about 80° C. to about 250° C., about 100° C. to about 230° C., and, in certain embodiments, from about 120° C. to about 190° C. The first stage may be carried out under atmospheric pressure and may be carried out for from about 0 hours to about 5 hours and, in some embodiments, from about 0.25 hour to about 3 hours. After melting, a catalyst may be added to the melt, and co-oligo(phosphonate carbonate)s may be prepared from the aromatic dihydroxide, diaryl carbonate and diaryl alkylphosphonate by applying a vacuum (up to about 2 mmHg), increasing the temperature (up to about 260° C.), and distilling off monophenol produced as a by-product of the polycondensation. The co-oligo(phosphonate carbonate) thus prepared may have an average molecular weight Mw (determined by measuring the relative solution viscosity in dichloromethane or in mixtures of equal amounts by weight of phenol/o-dichlorophenol, calibrated by light scattering) in the range of from about 2000 to about 18,000, and in some embodiments, from about 4000 to about 15,000. In such embodiments, up to about 80% of the monophenol can be recovered from the process.

In a second stage, copoly(phosphonate carbonate) may be prepared from the co-oligo(phosphonate carbonate)s prepared in the first step by increasing the reaction temperature to from about 250° C. to about 320° C. or about 270° C. to about 295° C. and reducing the pressure to less than about 2 mmHg. The by-product monophenols may be recovered in the second step. The amount of monophenol produced in the second step may be less than the amount of monophenol produced in the first step as the monophenol are a result loss of end groups in the co-oligo(phosphonate carbonate) and copoly(phosphonate carbonate)s in the reaction. For example, the amount of monophenol produced may be less than about 5%, less than about 2%, or less than about 1% of the amount of monophenol produced in the first step.

The methods of various embodiments may be carried out batchwise or continuously in, for example, stirred tanks, thin-film evaporators, falling-film evaporators, stirred tank cascades, extruders, kneaders, simple disc reactors, disc reactors for high viscosity substances, and combinations thereof. The devices, apparatuses and reactors suitable for the individual reaction evaporator stages may depend on the course of the process and may include, but are not limited to, heat exchangers, flash apparatuses, separators, columns, evaporators, stirred containers, reactors, and any other commercially available apparatuses which provide the necessary residence time at selected temperatures and pressures. The chosen devices must permit the necessary heat input and must be designed so that they are suitable for the continuously increasing melt viscosity. The various devices may be connected to one another via pumps, pipelines, valves, and the like, and combinations thereof. The pipelines between all facilities are preferably as short as possible and the number of bends in the pipes kept as small as possible in order to avoid unnecessarily prolonging residence times.

Embodiments of the invention are not limited to a particular transesterification catalyst, and any transesterification catalyst known in the art may be used in the methods described above. However, in certain embodiments, the catalyst may be a volatile catalyst and, in other embodiments, a metal-free volatile catalyst. In particular embodiments, the catalysts may be volatile compounds of the general formula I:

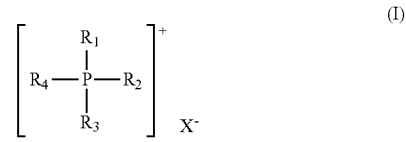

wherein
$R_1$, $R_2$, $R_3$ and $R_4$ are each, independently, $C_1$ to $C_{18}$ alkylenes, $C_6$ to $C_{10}$ aryls, or $C_5$ to $C_6$ cycloalkyls; and
$X^-$ is an anion where the corresponding acid-base pair $H^+ + X^- \rightarrow HX$ has a pKb of <11. Non-limiting examples of catalysts falling within the compounds encompassed by formula I include, but are not limited to, tetraphenylphosphonium fluoride, tetraphenylphosphonium tetraphenylborate and tetraphenylphosphonium phenolate. In certain embodiments, the catalyst may be tetraphenylphosphonium phenolate. The amount of catalyst of formula I provided to the reaction may vary among embodiments, and may be, for example, $10^{-2}$ to $10^{-8}$ mol per mole of aromatic dihydroxide or $10^{-3}$ to $10^{-6}$ mol per mole of aromatic dihydroxide.

In some embodiments, the reaction may further include one or more co-catalysts, which can be provided in addition to the one or more catalyst to increase the rate of the polymerization. Such co-catalysts may be, for example, salts of alkali metal salts and alkaline earth metal salts such as, for example, hydroxides, alkoxides, and aryl oxides of lithium, sodium, and potassium. In certain embodiments, the alkali metal salt may be a hydroxide, alkoxide, or aryl oxide salt of sodium, and in some embodiments, the co-catalyst may be sodium hydroxide and sodium phenolate. The amount of the co-catalyst provided may vary and may be, for example, from about 1 µg/kg to about 200 µg/kg, 5 µg/kg to 150 µg/kg, and, in certain embodiments, about 10 µg/kg to about 125 µg/kg, based in each case on the mass of aromatic dihydroxide used calculated in each case as sodium. In certain embodiments, the copoly(phosphonatecarbonate)s of the invention may be prepared without co-catalysts.

Without wishing to be bound by theory, the use of high purity diaryl alkylphosphonate in the preparation of copoly(phosphonate carbonate)s may provide particularly advantageous properties including improved melt processability, improved mechanical properties, improved hydrolytic stability, and improved heat stability as measured by heat distortion temperature (HDT) over copoly(phosphonate carbonate)s prepared using less pure diaryl alkylphosphonates previously described, and the improved properties are better than could have been expected based on the previous descriptions of copoly(phosphonate carbonate)s. The high purity diaryl alkylphosphonates used in embodiments described above may have total acidic components of less than about 0.15% by weight, less than about 0.10% by weight, and in certain embodiments, less than about 0.05% by weight whereas diaryl alkylphosphonates used previously had total acidic components of greater than about 0.20% by weight or about 0.19% by weight. In particular embodiments, the copoly (phosphonate carbonate)s may be prepared with at least 20 mole % high purity diaryl alkylphosphonates based on the total amount of transesterification components (diaryl alkylphosphonate and diaryl carbonate). In certain embodiments, such copoly(phosphonate carbonate)s may be prepared with a volatile transesterification catalyst, and the properties of the copoly(phosphonate carbonate)s of the invention may further be enhanced when the bisphenol is BPA only.

In some embodiments, the monophenols eliminated during transesterification of the aromatic dihydroxide, diaryl carbonate, diaryl alkylphosphonate in the production of copoly (phosphonate carbonate) may be purified and isolated, prior to the use in the diaryl carbonate synthesis. The crude monophenols isolated during transesterification may be contaminated, inter alia, with diaryl carbonates, diaryl alkylphosphonate, aromatic dihydroxide, salicylic acid, isopropenylphenol, phenyl phenoxybenzoate, xanthone, hydroxymonoaryl carbonate, and the like depending on transesterification conditions and distillation conditions. The purification can be effected by the customary purification processes, e.g., distillation or recrystallization. The purity of the monophenols following purification may be greater than 99%, greater than 99.8%, or greater than 99.95%.

The random copoly(phosphonate carbonate)s of the invention can be used alone or in combination with other polymeric materials including oligomers, copolymers, and polymers of the same or other materials. For example, in some embodiments, the copoly(phosphonate carbonate)s of the invention can be combined with one or more commodity engineering plastics to impart fire resistance without detracting significantly from processing characteristics or hydrolytic or thermal stability. Engineering plastics as used herein include, both thermoplastics and thermosetting resins and may include, but are not limited to, polycarbonates, epoxies, derived polymers, polyepoxies (e.g., polymers resulting from the reaction of one or more epoxy monomer or oligomer with one or more chain extender or curing agent such as a mono or multifunctional phenol, amine, benzoxazine, anhydride or combination thereof), benzoxazines, polyacrylates, polyacrylonitriles, polyesters, such as, poly(ethylene terephthalate), poly(trimethylene terephthalate), and poly(butylene terephthalate)], unsaturated polyesters, polyamides, polystyrenes including high impact strength polystyrene, polyureas, polyurethanes, polyphosphonates, polyphosphates, poly (acrylonitrile butadiene styrene)s, polyimides, polyarylates, poly(arylene ether)s, polyethylenes, polypropylenes, polyphenylene sulfides, poly(vinyl ester)s, polyvinyl chlorides, bismaleimide polymers, polyanhydrides, liquid crystalline polymers, cellulose polymers, or any combination thereof (commercially available from, for example, Sabic Plastics, Pittsfield, Mass.; Rohm & Haas Co., Philadelphia, Pa.; Bayer Corp.—Polymers, Akron, Ohio; Reichold; DuPont; Huntsman LLC, West Deptford, N.J.; BASF Corp., Mount Olive, N.J.; Dow Chemical Co., Midland, Mich.; GE Plastics; DuPont; Bayer; Dupont; ExxonMobil Chemical Corp., Houston, Tex.; ExxonMobil.; Mobay Chemical Corp., Kansas City, Kans.; Goodyear Chemical, Akron, Ohio; BASF Corp.; 3M Corp., St. Paul, Minn.; Solutia, Inc., St. Louis, Mo.; DuPont; and Eastman Chemical Co., Kingsport, Tenn., respectively). In particular embodiments, the copoly(phosphonate carbonate)s of the invention may be combined with polyepoxies.

In other embodiments, the engineering polymer compositions of invention, which include copoly(phosphonate carbonate)s of the invention alone or the copoly(phosphonate carbonate)s of the invention in combination with another engineering polymer such as those described above, may include one or more additional components or additives commonly used with these materials, such as, for example, fillers, fibers, surfactants, organic binders, polymeric binders, crosslinking agents, coupling agents, anti-dripping agents such as fluorinated polyolefins, silicones, and aramid fibres, lubricants, mould release agents such as pentaerythritol tetrastearate, nucleating agents, anti-static agents such as conductive blacks, carbon fibres, carbon nanotubes, and organic antistatics such as polyalkylene ethers, alkylsulfonates, and polyamide-containing polymers), catalysts, colorants, inks, dyes, antioxidants, stabilizers, and the like and any combinations thereof. In such embodiments, the one or more additional components or additives may make up from about 0.001 wt. % to about 1 wt. %, about 0.005 wt. % to about 0.9 wt. %, about 0.005 wt. % to about 0.8 wt. %, about 0.04 wt. % to about 0.8 wt. %, and in particular embodiments, from about 0.04 wt. % to about 0.6 wt. % based on the total composition. In other embodiments, additional components such as glass fiber or other fillers may be provided at higher concentrations. For example, in some embodiments the copoly(phosphonate carbonate)s may include up to about 30 wt. % glass fiber, and in other embodiments, the copoly(phosphonate carbonate)s of the invention may include from about 5 wt. % to about 30 wt. %, from about 10 wt. % to about 25 wt. %, or about 15 wt. % to about 20 wt. % glass fiber.

Compositions including copoly(phosphonate carbonate)s and other engineering polymers and/or additional components or additives can be prepared by conventional means. For example, in some embodiments, the respective constituents can be mixed in a known manner and subjected to melt compounding and/or melt extrusion at temperatures such as about 200° C. to about 400° C. in customary aggregates such as internal kneaders, extruders, or twin-screw apparatuses. Mixing the individual constituents can be affected either successively or simultaneously and either at about room temperature (about 20° C.) or at higher temperature. For example, in some embodiments, the engineering plastic and/or all additional components or additives can be introduced into the copoly(phosphonate carbonate), by compounding. In other embodiments, the individual constituents can be introduced separately in different stages of the preparation process into the melt copoly(phosphonate carbonate). Thus, for example, additives can be introduced during or at the end of the transesterification of aromatic dihydroxides with organic carbonates and diphenylmethyl phosphonate, before or during the formation of co-oligo(phosphonate carbonate)s or before or after the polycondensation of the co-oligo(phosphonate carbonate)s into the melt copoly(phosphonate carbonate). The form of addition of the compounds according to the invention is not limited. For example, the engineering plastics and/or additional components or additives can be added as solids such as a powder, as concentrate in polycarbonate powder in solution. In industrial embodiments, a side extruder may be operated with a throughput of, for example, 200-1000 kg of copoly(phosphonate carbonate) per hour.

The polymer compositions of the invention can be used as coatings or adhesives or they can be used to fabricate articles, such as free-standing films, prepregs, fibers, foams, molded articles and fiber reinforced composites. In the case of fiber reinforced composites, the reinforcement may be in the form of continuous, woven, or chopped fibers including, but not limited to, glass, carbon, silicon carbide, and organic fibers or combinations thereof. These articles may be well suited for a variety of applications as support parts, electrical components, electrical connectors, printed wiring laminated boards, housings, subcomponents and components in consumer products that must meet UL or other standardized fire resistance standards.

The random copoly(phosphonate carbonate)s prepared as described above, or engineering polymer compositions including random copoly(phosphonate carbonate)s of the invention and an engineering polymer are generally self-extinguishing, i.e., they stop burning when removed from a flame and any drops produced by melting in a flame stop burning are almost instantly extinguishes and do not readily propagate fire to any surrounding materials. Moreover, these polymer compositions do not evolve noticeable smoke when a flame is applied.

EXAMPLES

Although the present invention has been described in considerable detail with reference to certain preferred embodiments thereof, other versions are possible. Therefore the spirit and scope of the appended claims should not be limited to the description and the preferred versions contained within this specification. Various aspects of the present invention will be illustrated with reference to the following non-limiting examples. The following examples are for illustrative purposes only and are not to be construed as limiting the invention in any manner.

Analytical Characterization

The amount of acidic components in diphenyl methylphosphonate (DPP) were determined by gas chromatography (GC) on a non polar column (Optima 5) by analyzing the sample after derivatization with MSTFA (N-Methyl-N-(tri-methylsilyl)trifluoracetamide) based on the area under the respective GC peaks.

Molecular weight distributions were determined by measuring 0.2% solutions of polymer in dichloromethane by gel permeation chromatography (GPC) with UV detection (at 254 nm). Calibration of the instrument was conducted with linear polycarbonate standards of known molecular weights. The weight average (Mw), number average (Mn) and polydispersity (Mw/Mn), referred to as PD, were evaluated from the chromatograms by using WinGPC software.

The determination of the hydrolytic stability was conducted using a water boil test. Random copoly(phosphonato-carbonate) samples consisting of 10 g of pellets were put into 100 ml of pure water (triple distilled) for up to 168 h under reflux conditions under atmospheric pressure. Samples were periodically removed and the relative viscosity ($\eta_{rel}$) was measured with an Ubbelohde viscometer at a concentration of 0.5 g/l in dichloromethane at 25° C. The change in $\eta_{rel}$ due to the water boil test were measured and used to assess hydrolytic stability.

Example 1

Block Copoly(Phosphonate Carbonate), Comparative Example Per U.S. Pat. No. 7,645,850

A block copoly(phosphonate carbonate) was synthesized via the reaction of oligo-phosphonates and oligo-carbonates produced in a two separate reactors. Into a 6 L stainless steel reactor equipped with a mechanical stirrer and a reflux column, 2,2-bis(4-hydroxyphenyl)propane (BPA) (1140 g, 5.000 mol), diphenylcarbonate (DPC) (1110 g, 5.187 mol), and the catalyst, tetraphenylphosphonium phenolate (TPPP, 0.3 g, 70% in phenol, 0.49 mmol) were added under nitrogen. The monomer/catalyst mixture was heated to 250° C. under slightly reduced pressure (933 mbar). After 15 min at 250° C. the pressure was reduced to 667 mbar, and then gradually to 13 mbar over a total period of 2 hrs. 45 mins. The by-product phenol was removed by distillation and collected in a graduated receiving flask. A total of 860 mL of phenol was collected.

Into a second 12 L stainless steel reactor equipped with a mechanical stirrer and two reflux columns connected in series, 2,2-bis-(4-hydroxyphenyl)propane (BPA, 554 g, 2.430 mol), diphenyl methylphosphonate (DPP) (603.0 g, 2.431 mol) and the catalyst, tetraphenylphosphonium phenolate (TPPP, 0.192 g, 70% phenol, 0.310 mmol) were added under nitrogen. Analysis of the DPP prior to performing this reaction indicated that this batch contained 0.02% acidic components. The monomer/catalyst mixture was heated to 265° C. under slightly reduced pressure (933 mbar). After 15 mins. at 265° C., the pressure was reduced to 280 mbar and then gradually to 5.3 mbar over a total period of 5 hr. The by-product phenol was removed by distillation and collected in a graduated receiving flask. A total of 390 mL of phenol was collected. The oligo-phosphonate product was transferred via a stainless steel bridge to the 6 L stainless steel reactor containing the oligo-carbonate product held at 265° C. Additional catalyst, tetraphenylphosphonium phenolate (TPPP, 0.450 g, 70% in phenol, 0.80 mmol) was added. After 30 mins. the reaction temperature was increased to 305° C. and the pressure reduced to <0.4 mbar. The oligomers were allowed to react until a torque of 11.30 Nm was achieved (6 hrs. 15 mins.). The final product was extruded through the die at the bottom of the reactor into a water bath and pelletized using a granulator.

Examples 2 and 3

Random Copoly(Phosphonate Carbonate)s, Comparative Example

Random copoly(phosphonato-carbonate)s were synthesized in a multi-step process. First, the monomers 2,2-bis(4-hydroxyphenyl)propane (BPA) (79.67 g=0.349 mol), diphenylcarbonate (DPC) (55.033 g, 0.257 mol), diphenyl methylphosphonate (DPP) (27.329 g, 0.110 mol) and the catalyst, tetraphenylphosphonium phenolate (TPPP, 0.0943 g, 68% in Phenol, 0.148 mmol) were placed into a three neck flask equipped with a distillation bridge and a mechanical stirrer. Analysis of the DPP prior to performing this reaction indicated that this batch contained 0.19% acidic components. The monomer/catalyst mixture was heated to a temperature of 190° C. to melt the solids under atmospheric pressure and a nitrogen atmosphere. After melting, the mixture was stirred for 45 mins. at a rate of 400 revolutions per minute (rpm). After stirring for 45 mins. at 190° C. the temperature was increased to 200° C. After reaching 200° C., the pressure was reduced to 200 mbar. The reaction commenced and the by-product phenol was removed by distillation and collected in a receiving flask which was kept cool by an ice water. After a dwell time of 20 mins., the pressure was lowered to 100 mbar and the temperature was increased to 215° C. After another dwell time of 20 mins., the pressure was lowered to 50 mbar and the temperature was increased to 250° C. After an additional dwell time of 20 mins., the pressure was lowered to 25 mbar and the temperature was increased to 260° C. After a dwell time of 20 mins., the pressure was lowered to 4 mbar and the temperature was increased to 290° C. After a dwell time of 5 mins., the speed of stirrer was reduced to 250 rpm. After an additional 20 mins. dwell time, the speed of the stirrer was lowered to 100 rpm. After 20 mins. more of dwell time, the pressure was lowered to 1 mbar and temperature was increased to 310° C. After a dwell time of 45 mins. more, the speed of the stirrer was lowered to 50 rpm. After a dwell time of 15 mins. more, the first samples were removed for analysis (1 h sample means 1 hour at high vacuum stage of 1 mbar). After an additional 1 h at 310° C., 1 mbar and speed of 50 rpm a second sample was removed for analysis (2 h sample means 2 hours at high vacuum stage of 1 mbar).

Example 4

Random Copoly(Phosphonate Carbonate), Comparative Example

Example 4 is a repeat of Example 2 except that the DPP used contained 0.337% acidic components.

Examples 2-3 are for comparison and were produced using the synthetic conditions of the present invention, but with lower purity DPP (about 0.19% acidic components).

Examples 5-11

Random Copoly(Phosphonate Carbonate)s, Invention

For examples 5-11, a high purity batch of DPP with an amount of acidic components ≤0.12% was used. In addition, the amount of catalyst used was varied. The reaction conditions for Examples 5-11 were identical and are described below.

Random copoly(phosphonate carbonate)s were synthesized in a multi-step process. First, the monomers 2,2-bis(4-hydroxyphenyl)propane (BPA) (79.67 g=0.349 mol), diphenylcarbonate (DPC) (55.033 g, 0.257 mol), diphenyl methylphosphonate (DPP) (27.329 g, 0.110 mol) and the catalyst, tetraphenylphosphonium phenolate (TPPP, 0.0943 g, 68% in Phenol, 0.148 mmol) were placed into a three neck flask equipped with a distillation bridge and a mechanical stirrer. Analysis of the DPP prior to performing this reaction indicated that this batch contained 0.12% acidic components. The monomer/catalyst mixture was heated to a temperature of 190° C. to melt the solids under atmospheric pressure and a nitrogen atmosphere. After melting, the mixture was stirred for 45 mins. at a rate of 400 revolutions per minute (rpm). After stirring for 45 mins. at 190° C. the temperature was increased to 200° C. After reaching 200° C., the pressure was reduced to 200 mbar. The reaction commenced and the byproduct phenol was removed by distillation and collected in a receiving flask which was kept cool by an ice water. After a dwell time of 20 mins., the pressure was lowered to 100 mbar and the temperature was increased to 215° C. After another dwell time of 20 mins., the pressure was lowered to 50 mbar and the temperature was increased to 250° C. After an additional dwell time of 20 mins., the pressure was lowered to 25 mbar and the temperature was increased to 260° C. After a dwell time of 20 mins., the pressure was lowered to 4 mbar and the temperature was increased to 290° C. After a dwell time of 5 mins. the speed of stirrer was reduced to 250 rpm. After an additional 20 mins. dwell time, the speed of the stirrer was lowered to 100 rpm. After 20 mins. more of dwell time, the pressure was lowered to 1 mbar and temperature was increased to 310° C. After a dwell time of 45 mins. more, the speed of the stirrer was lowered to 50 rpm. After a dwell time of 15 mins. more, the first samples were removed for analysis (1 h sample means 1 hour at high vacuum stage of 1 mbar). After an additional 1 h at 310° C., 1 mbar and speed of 50 rpm a second sample was removed for analysis (2 h sample means 2 hours at high vacuum stage of 1 mbar).

The exact description of the initial weights of all reactants and the amount of acidic byproducts in DPP are described in Table 1.

Examples 12-17

Random Copoly(Phosphonate Carbonate)s: Invention

The DPP used for examples 12-17 contained total acidic components at maximum 0.034%.

Random copoly(phosphonate carbonate)s were synthesized in a multi-step process. First, the monomers BPA (9000±200 g), DPC (6500±200 g), DPP (2900±100 g) and the catalyst TPPP (10.8±0.2 g, 68% in phenol) were placed into a mixing vessel and heated to 190° C. under atmospheric pressure and a nitrogen atmosphere. The solids melted and the reaction mixture was stirred for 45 mins. at 400 rpm. The molar ratio of (DPP+DPC)/BPA was 1.06 and 1.07, respectively, relative to the BPA concentration of 1.0 at the beginning of the reaction. The amount of DPP was fixed in that way that the ratio of DPP to the sum of DPP+DPC based on masses was 31%. The exact description of each composition with all initial weights is depicted in Table 2.

After a reaction time of 45 mins. at 190° C. under atmospheric pressure, the reaction mixture was transferred to the bottom of a falling film evaporator. The falling film evaporator has a temperature of 190° C. and was at atmospheric pressure under nitrogen. After complete transfer, the pressure of the falling film evaporator was lowered to 200 mbar. The reaction mixture was pumped in a circle over a downpipe that was heated from the outside. The amount pumped in the circle was maintained constant for the whole experiment and adds up to the fourfold of the amount of liquid originally transferred to the falling film evaporator per hour in the beginning Phenol that was generated during the reaction was removed by distillation and collected in a separate container thereby removing it from the reaction mixture. After a dwell time of 20 mins., the pressure was reduced to 100 mbar and the temperature was increased to 220° C. All the while, the reaction mixture was pumped in circle over the downpipe. After a dwell time of 20 mins., the pressure was lowered to 50 mbar and the temperature was raised to 250° C. while continually pumping the reaction mixture in a circle over the downpipe. After a dwell time of 20 mins., the pressure was lowered to 35 mbar and the temperature was raised to 265° C. while continually pumping the reaction mixture in a circle over the downpipe. After a dwell time of 20 mins., the reaction mixture was pumped into a disc reactor. In the disc reactor, the polymerization was continued at 270° C. under a pressure of 4 mbar with a disc rotating speed of 2.5 rpm. All the while, phenol that was generated during the reaction was removed by distillation. After a dwell time of 45 mins., the pressure was lowered to 1 mbar and the temperature was increased to 305° C. and the rotating speed of the discs was reduced to 1 rpm. The reaction was continued until the final viscosity was reached (details see Table 2). After reaching the final viscosity the polymer was pumped out of the reactor through a die and into a water bath. The solid polymer was then pelletized using a granulator.

Examples 18-20

Random Copoly(Phosphonate Carbonate)s: Invention

The reaction conditions according to temperatures, pressures, speed of stirrer and dwell times were exactly as for examples 5-11 but with different ratios of DPP/(DPP+DPC), see Table 3.

The initial weights of all monomers used in these examples and the amount of acidic byproducts in DPP are described in Table 3.

Examples 21-23

Examples 21-23 were run with DPP that was either made in house or obtained from Rhodia. The DPP that was made in house contained 0.03% acidic components. The DPP that was obtained from Rhodia contained 0.92% acidic components.

Example 21. Into 6 L reactor equipped with a distillation column and mechanical stirrer was placed the 2,2-bis-(4-hydroxyphenyl)propane (bisphenol A, 1.411 kg, 6.19 mol), high purity methylphosphonic acid diphenyl ester (DPP) (0.50 kg, 2.013 mol), Diphenyl carbonate (0.929 kg, 4.34 mol) and 1.67 g Tetraphenylphosphonium phenolate (TPPP) catalyst (70% in phenol). Analysis of the DPP prior to performing this reaction indicated that this batch contained 0.03% acidic components. The mixture was heated to 250° C. while reducing the pressure from 700 to 4 mm Hg over about 5 hours period. The distillate collected was 1101 g. The product of this mixture was oligo-carbonate-phosphonate.

Then the mixture was heated from 250 to 300° C. while reducing the pressure from 10 to 1.5 mm Hg over about 5 hours period. Approximately 138 g of distillate was collected over the course of this reaction. The copolycarbonate/phosphonate product was extruded out of reactor into a water bath to form a strand and subsequently pelletized. The yield of the copolymer product out of the reactor was 1586 g. The copolymer was transparent, yellowish color and tough.

Example 22 was performed according the same procedure described for example 21. Instead of TPPP, sodium phenolate was used as a catalyst Example 23. Into 6 L reactor equipped with a distillation column and mechanical stirrer was placed the 2,2-bis-(4-hydroxyphenyl)propane (bisphenol A, 1.411 kg, 6.19 mol), high purity methylphosphonic acid diphenyl ester (DPP) (0.50 kg, 2.013 mol), Diphenyl carbonate (0.929 kg, 4.34 mol) and 1.67 g Tetraphenylphosphonium phenolate (TPPP) catalyst (70% in phenol). The DPP was obtained from Rhodia and analysis of the DPP prior to performing this reaction indicated that this batch contained 0.92% acidic components. The mixture was heated to 250° C. while reducing the pressure from 700 to 4 mm Hg over about 5 hours period. The distillate collected was 1130 g. The product of this mixture was oligo-carbonate-phosphonate.

Then the mixture was heated from 250 to 300° C. while reducing the pressure from 10 to 1.5 mm Hg over about 1 hour period. A drastic increase of viscosity was observed in the last half hour. Approximately 133 g of distillate was collected over the course of this reaction. The copolycarbonate/phosphonate product could not be extruded out of reactor as a strand form due to the high viscosity and rubbery behavior. The yield of the copolymer product out of the reactor was 1492 g.

The composition of the examples and the results from the analytical characterization are presented in Tables 1-4.

TABLE 1

Composition and Characterization of Examples 1-11

| | Example | | | | | |
|---|---|---|---|---|---|---|
| | 1 | 2 | 3 | 4 | 5 | 6 |
| Monomers | | | | | | |
| BPA [g] | 1694 | 79.67 | 79.67 | 79.67 | 79.67 | 79.67 |
| DPC [g] | 1110 | 55.033 | 55.033 | 55.033 | 55.033 | 55.033 |
| DPP [g] | 603 | 27.33 | 27.33 | 27.33 | 27.33 | 27.33 |
| TPPP [g] | 0.942** | 0.0943 | 0.0943 | 0.0943 | 0.0943 | 0.1509 |
| acidic components in DPP [%] | 0.02 | 0.19 | 0.19 | 0.337 | 0.12 | 0.12 |
| DPP/(DPP + DPC) [mass.-%] | 35.2 | 33.2 | 33.2 | 33.2 | 33.2 | 33.2 |
| DPP/(DPP + DPC) [mol/mol] | 31.9 | 30.0 | 30.0 | 30.0 | 30.0 | 30.0 |
| (DPP + DPC)/BPA [mol/mol] | 1.026 | 1.052 | 1.052 | 1.052 | 1.052 | 1.052 |
| Time 1 mbar stage at 310° C. [h] | | 1 | 2 | 1 | 2 | 2 |
| ηrel | 1.268 | 1.075 | 1.087 | 1.086 | 1.283 | 1.263 |
| Mw [g/mole] | 29800 | 5451 | 6886 | 6395 | 29207 | 33919 |
| PD (Mw/Mn) | 2.23 | 2.586 | 2.543 | 2.423 | 2.67 | 2.93 |
| Hydrolytic stability Δ ηrel | | | | | | |
| After 24 hours | −0.009 | n.d. | n.d. | n.d. | −0.008 | −0.008 |
| After 48 hours | −0.046 | n.d. | n.d. | n.d. | −0.016 | −0.017 |
| After 72 hours | −0.106 | n.d. | n.d. | n.d. | −0.033 | −0.033 |
| After 168 hours | −0.196 | n.d. | n.d. | n.d. | −0.085 | −0.085 |

TABLE 1-continued

Composition and Characterization of Examples 1-11

| | Example | | | | |
|---|---|---|---|---|---|
| | 7 | 8 | 9 | 10 | 11 |
| Monomers | | | | | |
| BPA [g] | 79.67 | 79.67 | 79.67 | 79.67 | 79.67 |
| DPC [g] | 55.033 | 55.033 | 55.033 | 55.033 | 55.033 |
| DPP [g] | 27.33 | 27.33 | 27.33 | 27.33 | 27.33 |
| TPPP [g] | 0.0943 | 0.0472 | 0.0472 | 0.0283 | 0.066 |
| acidic components in DPP [%] | 0.033 | 0.033 | 0.033 | 0.033 | 0.033 |
| DPP/(DPP + DPC) [mass.-%] | 33.2 | 33.2 | 33.2 | 33.2 | 33.2 |
| DPP/(DPP + DPC) [mol/mol] | 30.0 | 30.0 | 30.0 | 30.0 | 30.0 |
| (DPP + DPC)/BPA [mol/mol] | 1.052 | 1.052 | 1.052 | 1.052 | 1.052 |
| Time 1 mbar stage at 310° C. [h] | 2 | 1 | 2 | 2 | 2 |
| $\eta_{rel}$ | 1.261 | 1.218 | 1.24 | 1.233 | 1.252 |
| Mw [g/mole] | 28413 | 22359 | 28169 | 26270 | 29532 |
| PD (Mw/Mn) | 2.45 | 2.42 | 2.56 | 2.55 | 2.67 |
| Hydrolytic stability $\Delta \eta_{rel}$ | | | | | |
| After 24 hours | −0.007 | n.d. | −0.004 | −0.005 | −0.006 |
| After 48 hours | −0.016 | n.d. | −0.013 | −0.015 | −0.023 |
| After 72 hours | −0.029 | n.d. | −0.023 | −0.026 | −0.051 |
| After 168 hours | −0.08 | n.d. | −0.061 | −0.065 | −0.104 | n.d.: not determined
*Acidic components in DPP: Sum of phosphoric acid, phosphonic acid, methyl phosphonic acid and methyl phosphonic acid mono phenylester.
**Initially TPPP amount was 0.492 g, 0.450 g was added during the postcondensation step.

TABLE 2

Composition and Characterization of Examples 12-17

| | Example | | | | | |
|---|---|---|---|---|---|---|
| | 12 | 13 | 14 | 15 | 16 | 17 |
| Monomers | | | | | | |
| BPA [g] | 8872 | 9192 | 8869 | 8869 | 8973 | 9142 |
| DPC [g] | 6419 | 6650 | 6417 | 6417 | 6492 | 6553 |
| DPP [g] | 2884 | 2987.8 | 2882.8 | 2882.8 | 2916.6 | 2944 |
| TPPP [g] | 10.6 | 11.0 | 10.6 | 10.6 | 10.7 | 10.9 |
| acidic components* in DPP [%] | 0.031 | 0.03 | 0.034 | 0.029 | 0.022 | 0.013 |
| DPP/(DPP + DPC) [mass-%] | 31.0 | 31.0 | 31.0 | 31.0 | 31.0 | 31.0 |
| DPP/(DPP + DPC) [mol-%] | 27.9 | 27.9 | 27.9 | 27.9 | 27.9 | 27.9 |
| (DPP + DPC)/BPA [mol/mol] | 1.070 | 1.070 | 1.070 | 1.070 | 1.070 | 1.060 |
| Time 1 mbar stage at 305° C. [h] | 2.5 | 2.8 | 2.25 | 2.18 | 3.45 | 4.28 |
| $\eta_{rel}$ | 1.28 | 1.282 | 1.287 | 1.280 | 1.276 | 1.312 |
| Mw [g/mole] | 32564 | 33973 | 34401 | 33693 | 32405 | 37643 |
| PD | 2.63 | 2.74 | 2.80 | 2.90 | 2.56 | 2.80 |

TABLE 2-continued

Composition and Characterization of Examples 12-17

| | Example | | | | | |
|---|---|---|---|---|---|---|
| | 12 | 13 | 14 | 15 | 16 | 17 |
| Hydrolytic stability Δ η$_{rel}$ | | | | | | |
| After 24 hours | −0.010 | −0.010 | −0.011 | n.d. | −0.010 | −0.012 |
| After 48 hours | −0.017 | −0.014 | −0.019 | n.d. | −0.019 | −0.025 |
| After 72 hours | −0.028 | −0.024 | −0.035 | n.d. | −0.029 | −0.044 |
| After 168 hours | −0.070 | −0.058 | −0.079 | n.d. | −0.073 | −0.109 | n.d.: not determined
*Acidic components in DPP: Sum of phosphoric acid, phosphonic acid, methyl phosphonic acid and methyl phosphonic acid mono phenylester.

TABLE 3

Composition and Characterization of Examples 18-20

| Example | 18 | 19 | 20 |
|---|---|---|---|
| Monomers | | | |
| BPA [g] | 79.67 | 79.67 | 79.67 |
| DPC [g] | 74.69 | 62.895 | 43.24 |
| DPP [g] | 4.55 | 18.23 | 40.99 |
| TPPP [g] | 0.04715 | 0.0943 | 0.1886 |
| acidic components* in DPP [%] | 0.007 | 0.007 | 0.007 |
| DPP/(DPP + DPC) [mass.-%] | 5.7 | 22.5 | 48.7 |
| DPP/(DPP + DPC) [mol-%] | 5.0 | 20.0 | 45.0 |
| (DPP + DPC)/BPA [mol/mol] | 1.052 | 1.052 | 1.051 |
| Time 1 mbar stage at 305° C. [h] | 2 | 2 | 2 |
| η$_{rel}$ | 1.23 | 1.246 | 1.231 |
| Mw [g/mole] | 21674 | 26403 | 42820 |
| PD | 2.21 | 2.43 | 3.89 |
| Hydrolytic stability ΔEtarel. to initial value | | | |
| After 24 hours | −0.001 | −0.004 | −0.015 |
| After 48 hours | −0.003 | −0.009 | −0.043 |
| After 72 hours | −0.004 | −0.013 | −0.077 |
| After 168 hours | −0.007 | −0.030 | −0.154 |

*Acidic components in DPP: Sum of phosphoric acid, phosphonic acid, methyl phosphonic acid and methyl phosphonic acid mono phenylester

TABLE 4

Composition and Characterization of Examples 21-23

| Example | 21 | 22 | 23 |
|---|---|---|---|
| Monomers | | | |
| BPA [g] | 1411 | 1411 | 1411 |
| DPC [g] | 929 | 929 | 929 |
| DPP [g] | 500 | 500 | 500 |
| TPPP [g] | 1.67 | | 1.67 |
| NaPhenolate [g] | | 0.05 | |
| acidic components* in DPP [%] | 0.03 | 0.03 | 0.92 |
| DPP/(DPP + DPC) [mass.-%] | 35 | 35 | 35 |
| DPP/(DPP + DPC) [mol-%] | 31.7 | 31.7 | 31.7 |
| (DPP + DPC)/BPA [mol/mol] | 1.027 | 1.027 | 1.027 |
| Total reaction time [min] | 615 | 615 | 355 |
| Torque at end of reaction [Nm] | 8.4 | 10.7 | 8.9 |
| η$_{rel}$ | 1.237 | 1.25 | 1.247 |
| Mw [g/mole] | 26715 | 28900 | 31900 |
| Mn [g/mole] | 11400 | 12600 | 7600 |
| PD | 2.34 | 2.29 | 4.18 |
| Hydrolytic stability ΔEtarel. to initial value | | | |
| After 24 hours | −0.009 | 0 | −0.032 |
| After 48 hours | −0.015 | −0.007 | −0.051 |
| After 72 hours | −0.015 | −0.022 | −0.044 |

*Acidic components in DPP: Sum of phosphoric acid, phosphonic acid, methyl phosphonic acid and methyl phosphonic acid mono phenylester In analyzing the results form the various examples, comparative example 1 was a block copolymer and used high purity DPP (0.02% acidic components). The block copoly (phosphonate carbonate) exhibited high Mw and a polydispersity (PD) value of 2.23. Example 1 exhibited relatively poor hydrolytic stability after the 168 hr water boil test with a reduction in relative viscosity of 0.196 (Table 1).

Example 2-4 were random copoly(phosphonate carbonate)s prepared from at least 20% DPP, DPC, BPA and TPPP, but the purity of DPP was lower, 0.19 acidic components for examples 2 and 3, and 0.337 acidic components for example 4 (Table 1). As shown in table 1, these three comparative examples did not attain high molecular weight as determined by both solution viscosity and GPC measurements. Hence, the process cannot be reasonably conducted under these conditions on industrial scale.

For Examples 5-11, which are representative of the present invention, high purity DPP (≤0.15% acidic components) was used to synthesize the random copoly(phosphonate carbonate)s. In all seven examples, high Mw was achieved ranging from about 22,000 to 34,000 g/mole. The polydispersities, PD, ranged from 2.42 to 2.93. The hydrolytic stabilities were excellent with reductions in the relative viscosities ranging from about 0.06 to 0.10 after the 168 hrs. water boil test (Table 1).

For Examples 12-17, which are representative of the present invention, high purity DPP (0.034% acidic components) was used to synthesize the random copoly(phosphonate carbonate)s in a multi-step process. First the reactants and catalyst were melted together in a mixing vessel and then they were transferred to a falling film evaporator that aids in phenol removal. After completion of this step, the reaction mixture was transferred to a disc reactor to complete the polymerization. In all six examples, high Mw was achieved ranging from about 32,400 to 37,600 g/mole. The polydispersities ranged from 2.56 to 2.90. The hydrolytic stabilities were excellent with reductions in the relative viscosities ranging from about 0.06 to 0.10 after the 168 hrs. water boil test (Table 2).

For Examples 18-20, which are representative of the present invention, high purity DPP (≤0.15% acidic components) was used to synthesize the random copoly(phosphonate carbonate)s following the same process used for examples 5-11. In these three examples however, different ratios of the monomers were used (Table 3). In all three of these examples, high Mw was achieved ranging from about 21,000 to 42,000 g/mole. The polydispersities, PD, ranged from 2.21 to 3.89. The hydrolytic stabilities were excellent with reductions in the relative viscosities ranging from about 0.007 to 0.15 after the 168 hrs. water boil test (Table 3).

Comparing examples 21 and 22 with example 23 show that by using DPP with a sufficient low level of acidic components, a polymer could be obtained with a sufficient high Mn (>10,000 g/mole) and a narrow polydisperisty that is smaller than 3. When using DPP with a relatively high level of acidic components (almost 1%), the torque on the stirrer that is used to stir the reaction mixture (which is a measure of the viscosity of the mixture and thus the Mw of the reaction mixture) rapidly increases. Consequently, the reaction needed to be terminated after only ~6 hrs in order to be able to remove the material from the reactor. However, although an Mw was obtained that was comparable to the reactions in which the high purity DPP was used, the Mn was not sufficiently high (e.g. higher than 9,000 g/mole). The consequent high polydispersity of about 4 indicates a branched or crosslinked material. The relatively high level of acidic components may have induced side reactions that led to this high PD.

Furthermore, the hydrolytic stability of the material made with the lower purity DPP (example 23) had a worse hydrolytic stability than the materials that were made with the high purity DPP (Examples 21 and 22).

The invention claimed is:

1. A random copoly(phosphonate carbonate) comprising randomly distributed monomeric units derived from carbonate and phosphonate monomers and having a weight average molecular weight of from about 10,000 g/mole to about 100,000 g/mole as determined by gel permeation chromatography and a polydispersity of from about 2 to about 7.

2. The random copoly(phosphonate carbonate) of claim 1, wherein the random copoly(phosphonate carbonate) comprises a number average molecular weight of from about 5,000 g/mole to about 50,000 g/mole as determined by gel permeation chromatography.

3. The random copoly(phosphonate carbonate) of claim 1, wherein the random copoly(phosphonate carbonate) comprises a polydispersity of from about 2 to about 4.

4. The random copoly(phosphonate carbonate) of claim 1, wherein the random copoly(phosphonate carbonate) comprises a phosphorous content of about 2% to about 10% by weight of the total random copoly(phosphonate carbonate).

5. The random copoly(phosphonate carbonate) of claim 1, wherein the random copoly(phosphonate carbonate) comprises total acidic components derived from phosphonate monomers of less than about 0.15% by weight.

6. The random copoly(phosphonate carbonate) of claim 1, comprising monomeric units derived from diphenylmethyl phosphonate, diphenyl carbonate, and 2,2-bis(4-hydroxyphenyl) propane.

7. The random copoly(phosphonate carbonate) of claim 1, wherein the random copolyphosphonate comprises no monomeric units derived from a branching agent.

8. The random copoly(phosphonate carbonate) of claim 1, further comprising fillers, fibers, surfactants, organic binders, polymeric binders, crosslinking agents, coupling agents, anti-dripping agents, lubricants, mould release agents, nucleating agents, anti-static agents, catalysts, colorants, inks, dyes, antioxidants, stabilizers, or combinations thereof.

9. A polymer blend comprising:
a random copoly(phosphonate carbonate) comprising randomly distributed monomeric units derived from carbonate and phosphonate monomers and having a phosphorous content of about 2% to about 10% by weight of the total random copoly(phosphonate carbonate) and total acidic components derived from phosphonate monomers of less than about 0.15% by weight; and
at least one other polymer, oligomer, or combination thereof to make a blend or mixture.

10. The polymer blend of claim 9, wherein the other polymer, oligomer, or combination thereof comprises carbonates, epoxies, benzoxazine, acrylates, acrylonitriles, esters, terephthalates, or combinations thereof 11. The polymer blend of claim 9, wherein the other polymer, oligomer, or combination thereof comprises polycarbonate, unsaturated polyester, polyamide, polystyrene (including high impact strength polystyrene), polyurea, polyurethane, polyphosphonate, poly(acrylonitrile butadiene styrene), polyimide, polyarylate, poly(arylene ether), poly(ethylene terephthalate), poly(trimethylene terephthalate), poly(butylene terephthalate), polyethylene, polypropylene, polyphenylene sulfide, poly(vinyl ester), polyvinyl chloride, bismaleimide polymer, polyanhydride, liquid crystalline polymer, cellulose polymer, or combinations thereof.

12. The polymer blend of claim 9, further comprising fillers, fibers, surfactants, organic binders, polymeric binders, crosslinking agents, coupling agents, anti-dripping agents, lubricants, mould release agents, nucleating agents, anti-static agents, catalysts, colorants, inks, dyes, antioxidants, stabilizers, or combinations thereof.

13. A polymer blend comprising:
a random copoly(phosphonate carbonate) comprising randomly distributed monomeric units derived from carbonate and phosphonate monomers and having a weight average molecular weight of from about 10,000 g/mole to about 100,000 g/mole as determined by gel permeation chromatography and a polydispersity of from about 2 to about 7; and
at least one other polymer, oligomer, or combination thereof to make a blend or mixture.

14. The polymer blend of claim 13, wherein the other polymer, oligomer, or combination thereof comprises carbonates, epoxies, benzoxazine, acrylates, acrylonitriles, esters, terephthalates, or combinations thereof.

15. The polymer blend of claim 13, wherein the other polymer, oligomer, or combination thereof comprises polycarbonate, unsaturated polyester, polyamide, polystyrene (including high impact strength polystyrene), polyurea, polyurethane, polyphosphonate, poly(acrylonitrile butadiene styrene), polyimide, polyarylate, poly(arylene ether), poly(ethylene terephthalate), poly(trimethylene terephthalate), poly(butylene terephthalate), polyethylene, polypropylene, polyphenylene sulfide, poly(vinyl ester), polyvinyl chloride, bismaleimide polymer, polyanhydride, liquid crystalline polymer, cellulose polymer, or combinations thereof.

16. The polymer blend of claim 13, further comprising fillers, fibers, surfactants, organic binders, polymeric binders, crosslinking agents, coupling agents, anti-dripping agents, lubricants, mould release agents, nucleating agents, anti-static agents, catalysts, colorants, inks, dyes, antioxidants, stabilizers, or combinations thereof.

17. An article of manufacture comprising a random copoly (phosphonate carbonate) comprising randomly distributed monomeric units derived from carbonate and phosphonate monomers and having a weight average molecular weight of from about 10,000 g/mole to about 100,000 g/mole as determined by gel permeation chromatography and a polydispersity of from about 2 to about 7.

18. The article of manufacture of claim 17, wherein the random copoly(phosphonate carbonate) comprises a phosphorous content of about 2% to about 10% by weight of the total random copoly(phosphonate carbonate).

19. The article of manufacture of claim 17, wherein the random copoly(phosphonate carbonate) comprises total acidic components derived from phosphonate monomers of less than about 0.15% by weight.

20. The article of manufacture of claim 17, wherein the random copoly(phosphonate carbonate) is in a blend or mixture comprising at least one other polymer, oligomer, or combination thereof.

21. The article of manufacture of claim 20, wherein the other polymer, oligomer, or combination thereof comprises carbonates, epoxies, benzoxazine, acrylates, acrylonitriles, esters, terephthalates, or combinations thereof.

22. The article of manufacture of claim 20, wherein the other polymer, oligomer, or combination thereof comprises unsaturated polyester, polyamide, polystyrene (including high impact strength polystyrene), polyurea, polyurethane, polyphosphonate, poly(acrylonitrile butadiene styrene), polyimide, polyarylate, poly(arylene ether), poly(ethylene terephthalate), poly(trimethylene terephthalate), poly(butylene terephthalate), polyethylene, polypropylene, polyphenylene sulfide, poly(vinyl ester), polyvinyl chloride, bismaleimide polymer, polyanhydride, liquid crystalline polymer, cellulose polymer, or combinations thereof.

23. The article of manufacture of claim 17, further comprising fillers, fibers, surfactants, organic binders, polymeric binders, crosslinking agents, coupling agents, anti-dripping agents, lubricants, mould release agents, nucleating agents, anti-static agents, catalysts, colorants, inks, dyes, antioxidants, stabilizers, or combinations thereof.

24. The article of manufacture of claim 17, wherein the article of manufacture comprises a coating, adhesive, prepreg, foam, film, fiber, molding, fiber reinforced laminate, or combination thereof.

25. The article of manufacture of claim 17, wherein the article of manufacture comprises a consumer product or component or portion thereof.

* * * * *